United States Patent [19]

Ekstrand

[11] Patent Number: 4,982,078
[45] Date of Patent: Jan. 1, 1991

[54] BEAM POSITION SENSOR WITH TIME SHARED NORMALIZING CIRCUIT

[75] Inventor: John P. Ekstrand, Palo Alto, Calif.

[73] Assignee: Spectra-Physics, Inc., Mountain View, Calif.

[21] Appl. No.: 452,723

[22] Filed: Dec. 19, 1989

[51] Int. Cl.⁵ .............................................. H01J 40/14
[52] U.S. Cl. .............................. 250/206.1; 250/203.3; 250/208.6
[58] Field of Search ................... 250/201.1, 201.5, 202, 250/203.3, 208.1, 208.2, 208.3, 206.1, 206.2, 208.6; 356/152; 219/121.78; 372/107

[56] References Cited

U.S. PATENT DOCUMENTS

| | | | |
|---|---|---|---|
| 3,579,140 | 5/1971 | Anderson et al. | 250/208.6 |
| 4,626,649 | 12/1986 | Dupeyrat et al. | 219/121.78 |
| 4,703,168 | 10/1987 | Olson | 250/208.1 |
| 4,749,849 | 6/1988 | Hoeberechts et al. | 250/206.1 |
| 4,864,651 | 9/1989 | Ogiwara et al. | 250/208.3 |

Primary Examiner—Edward P. Westin
Attorney, Agent, or Firm—Fliesler, Dubb, Meyer & Lovejoy

[57] ABSTRACT

A system for detecting position of a light beam propagating along a beam path utilizes a single variable gain preamplifier in a time shared mode for each of the outputs of a four quadrant position sensors. A detector mounted in the beam path and having a reference point, generates a plurality of signals indicating deviation from the reference in plural directions. A multiplexer is connected to the detector, and combines the plural signals into a time multiplexed output. A variable gain preamplifier normalizes the signals in the time multiplexed output to generate the normalized output. The normalized output is then supplied to a logic circuit for processing the normalized output to generate a position signal indicating the position of the light beam.

15 Claims, 3 Drawing Sheets 4,982,078

BEAM POSITION SENSOR WITH TIME SHARED NORMALIZING CIRCUIT

FIELD OF THE INVENTION

The present invention relates to beam position sensors. More particularly, the invention provides sensors using multiple quadrant photocells with signal processing to determine beam position with sensitivity independent of beam power.

DESCRIPTION OF RELATED ART

In laser related systems, there are many applications requiring a means for sensing the position of the laser beam. For instance, in aligning the mirrors of a resonant cavity, a system for detecting the position of the beam is required so that it may be adjusted. Typically, these sensors include four quadrant detectors precisely aligned in the path of the laser beam. Such a system is exemplified in U.S. Pat. No. 3,579,140, entitled LASER, invented by Anderson et al.

The Anderson et al. patent describes a four quadrant photocell which generates four independent outputs indicating the intensity of the beam in each of the four quadrants. By processing the four independent outputs, a position signal can be generated indicating the position of the beam in two dimensions. Other detectors, such as the four quadrant thermocouple detector described in U.S. Pat. No. 4,626,649, entitled CONTROL DEVICE FOR THE AUTOMATIC ALIGNMENT OF A LASER BEAM, invented by Dupeyrat et al., could be utilized as well.

These four quadrant detectors generate four independent output signals which must be processed through a sum and difference network to generate output signals indicating x and y position of the beam. In prior art systems, each of the four output signals has been passed through separate variable gain preamplifiers to normalize the four outputs so that they are independent of the power of the beam, prior to supplying the signals to the arithmetic circuits. However, the four preamps in a prior art system must track perfectly as the gains change, or the apparent position changes with the power level of the beam. This presents complex circuit designs which are difficult to tune.

Accordingly, it is desirable to produce signal processing circuitry for these position detectors that is simple and does not require matched variable gain amplifiers.

SUMMARY OF THE INVENTION

The present invention overcomes many of the problems of the prior art by providing signal processing circuitry utilizing a single variable gain preamplifier in a time shared mode for each of the outputs of the position sensors. This eliminates the need for matching preamplifiers. Further, because of the nature of the output of the time shared preamplifier, the sum and difference circuitries are simplified.

According to one aspect, the present invention provides an apparatus for detecting position of a light beam propagating along a beam path. The apparatus comprises a detector mounted in the beam path and having a reference point, for generating a first signal indicating deviation from the reference in a first direction, and a second signal indicating deviation from the reference in a second direction. A multiplexer is connected to the detector, and selects the first signal during a first time window and the second signal during a second time window as a time multiplexed output. A variable gain preamplifier normalizes the first and second signal in the time multiplexed output to generate a normalized output. The normalized output is then supplied to a logic circuit for processing the normalized output to generate a position signal indicating the position of the light beam. This position signal can be used in auto-alignment systems or supplied to a display as suits the need of a particular application.

According to another aspect of the invention, the detector is a four quadrant system generating four output signals indicating the intensity of the light beam in each of the four quadrants. The logic circuit generates a first position signal indicating the position of the light beam in an x dimension, and a second position signal indicating position of the light beam in a y dimension.

In one embodiment, the normalizing preamplifier includes an operational amplifier, receiving the time multiplexed output and supplying the normalized output. A feedback loop is connected between the output of the operational amplifier and its input for controlling the gain of the operational amplifier. The feedback loop includes an integrating amplifier, supplying a feedback signal based on the average level of the normalized output of the amplifier with respect to a preset reference value. A variable impedance element is coupled between the output of the operational amplifier and its input, and receives the feedback signal from the integrating amplifier. The variable impedance element supplies a variable impedance link between the amplifier output and the input to the operational amplifier in response to the feedback signal.

The logic circuit, in one embodiment, includes an invertor for inverting the normalized output. The normalized output and the inverted normalized output are supplied to a first switching element which generates a first combined signal, which includes positive samples from the first and second quadrants of the sensor and negative samples from the third and fourth quadrants of the sensor. This combined signal is then averaged to generate the position signal indicating the position in the x dimension. A second switching element receives the normalized output and the inverted normalized output, and generates a second combined signal, which has positive samples from the first and fourth quadrants and negative samples from the second and third quadrants. This second combined signal is likewise averaged to generating a second position signal indicating position in the y dimension.

Other aspects and advantages of the present invention can be seen upon review of the figures, the detailed description, and the claims which follow.

DETAILED DESCRIPTION

A detailed description of preferred embodiments of the present invention is described with reference to FIGS. 1 through 5.

Figure 1:
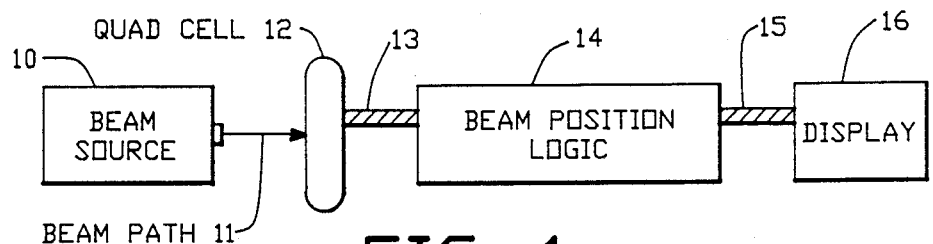
FIG. 1 is a schematic block diagram of a system for detecting the position of a beam of light.

FIG. 1 provides an overview of a system for detecting the position of a light beam. The light beam is generated by a beam source 10, such as a laser or other directional light source, for generating a light beam along beam path 11. A detector, such as a quadcell 12 is positioned so that the beam path intersects the detecting face of the quadcell 12. The quadcell 12 generates output signals across line 13 which are supplied to a beam position logic 14. The beam position logic generates output signals indicating the position of the beam in dimensions orthogonal to the direction of the beam path 11 across line 15. These signals are supplied to a display 16, or other systems that utilize the position signals, such as a mirror alignment system or the like.

Figure 2:
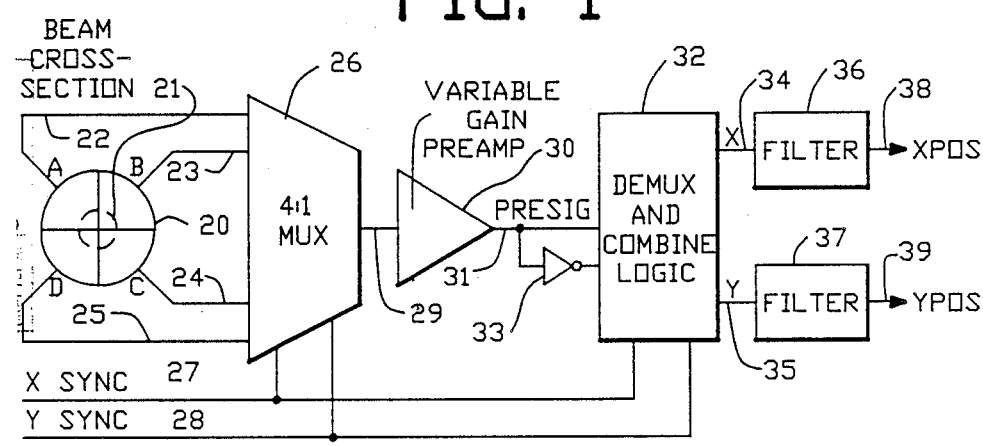
FIG. 2 is a schematic diagram of the beam position detector and logic according to the present invention.

FIG. 2 shows a schematic diagram of the beam position detecting logic according to the present invention. In this system, a four quadrant photodetector 20 is mounted in the beam path. A crosssection of the beam 21 is projected onto the detector 20. The intensity of the beam in each of the four quadrants is supplied as outputs A, B, C, D on lines 22, 23, 24, and 25, respectively. A quadcell photo detector generates outputs which indicate deviation of the beam from a reference point defined by the crossed lines separating the 4 quadrants on the detector. This is accomplished by generating 4 independent signals indicating the intensity of the beam falling in the respective quadrants. This provides indication of the deviation of the beam from the reference.

Lines 22–25 are supplied as inputs to a 4:1 multiplexer 26. The 4:1 multiplexer is controlled by timing signals XSYNC and YSYNC on lines 27 and 28, respectively. The output of the 4:1 multiplexer is supplied on line 29 and will consist of samples of signals A, B, C and D in successive timing windows. Line 29 is connected to the input of variable gain preamp 30. In this manner, the variable gain preamp 30 is used in a time shared mode by all four of the outputs of the detector 20. The average output of the variable gain preamp on line 31 is a normalized signal PRESIG that is insensitive to the power of the beam.

The PRESIG signal is supplied to a demultiplexing and combining logic 32, and through invertor 33 to the demultiplexing and combining logic 32. This logic also receives the XSYNC and YSYNC signals on lines 27 and 28. The outputs of the demultiplexing and combining logic 32 on line 32 comprise a first combined signal on line 34 and a second combined signal on line 35. The first and second combined signals are supplied through respective filters 36 and 37 for averaging. The output of the filters 36 and 37 are the x position signal on line 38 and the y position signal on line 39.

Figure 3:
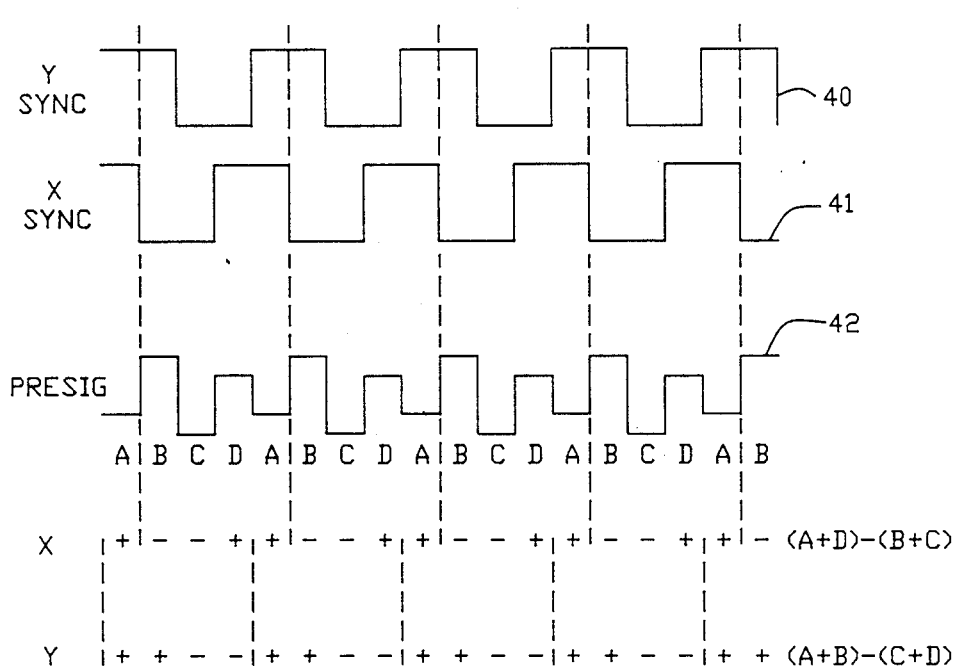
FIG. 3 is a signal diagram used in explanation of the circuit of FIG. 2.

The YSYNC and XSYNC signals are square waves 90° out of phase, operating at approximately 13 kiloHertz in the preferred embodiment, as shown in FIG. 3 at traces 40 and 41, respectively.

The PRESIG signal on line 31 consists of the time multiplexed samples of signals A, B, C and D as shown at trace 42 in FIG. 3.

In order to generate a signal indicating the x position, the first combined signal on line 34 consists of inverted samples of signals B and C and positive samples of signals D and A, $(A+D)-(B+C)$. The filter 36 averages these samples to generate a smooth analog output.

In order to generate a signal indicating the position of the beam in a y dimension, the second combined signal consists of positive samples of signals A and B and negative samples of signals C and D, $(A+B)-(C+D)$. Again, the filter 37 averages these four time multiplexed samples to generate a smooth analog output.

To alter the circuit to generate a position signal in a single dimension, the four quadrant detector 20 could be replaced with a 2 quadrant detector, such that for instance signals A and D would be combined into a single first signal and signals B and C would be combined into a second signal. The demultiplexing and combining logic would simply generate output indicating the positive value of the first signal and the negative value of the second signal. This output would then be averaged to generate the position signal for a single dimension. The circuit can be altered by similar modifications to generate 3 or more position signals.

Figure 4:
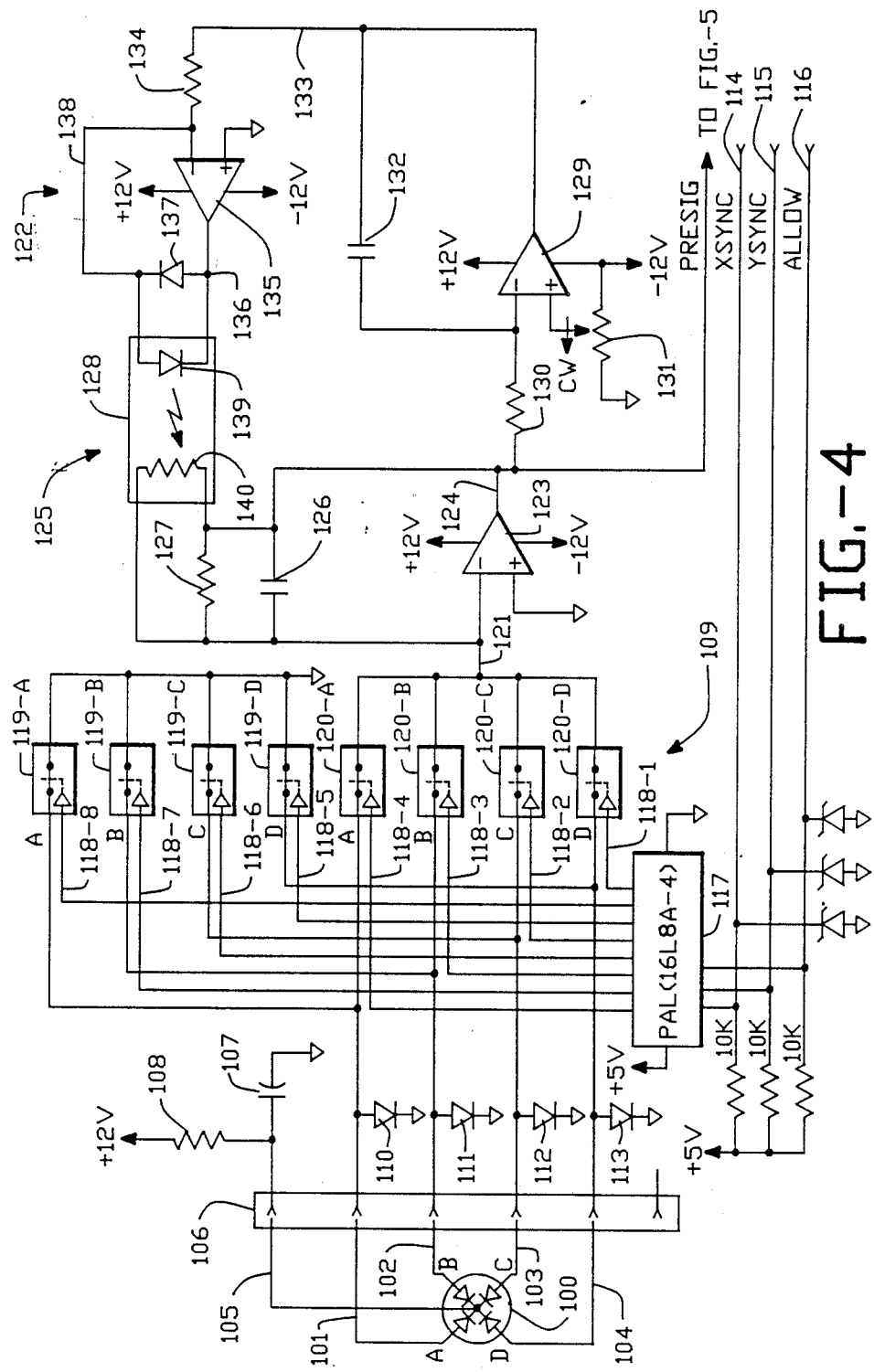
FIG. 4 is a schematic diagram of the first portion of a preferred embodiment of the present invention, including a four quadrant detector, a 4:1 multiplexer, and a preamplifier.
Figure 5:
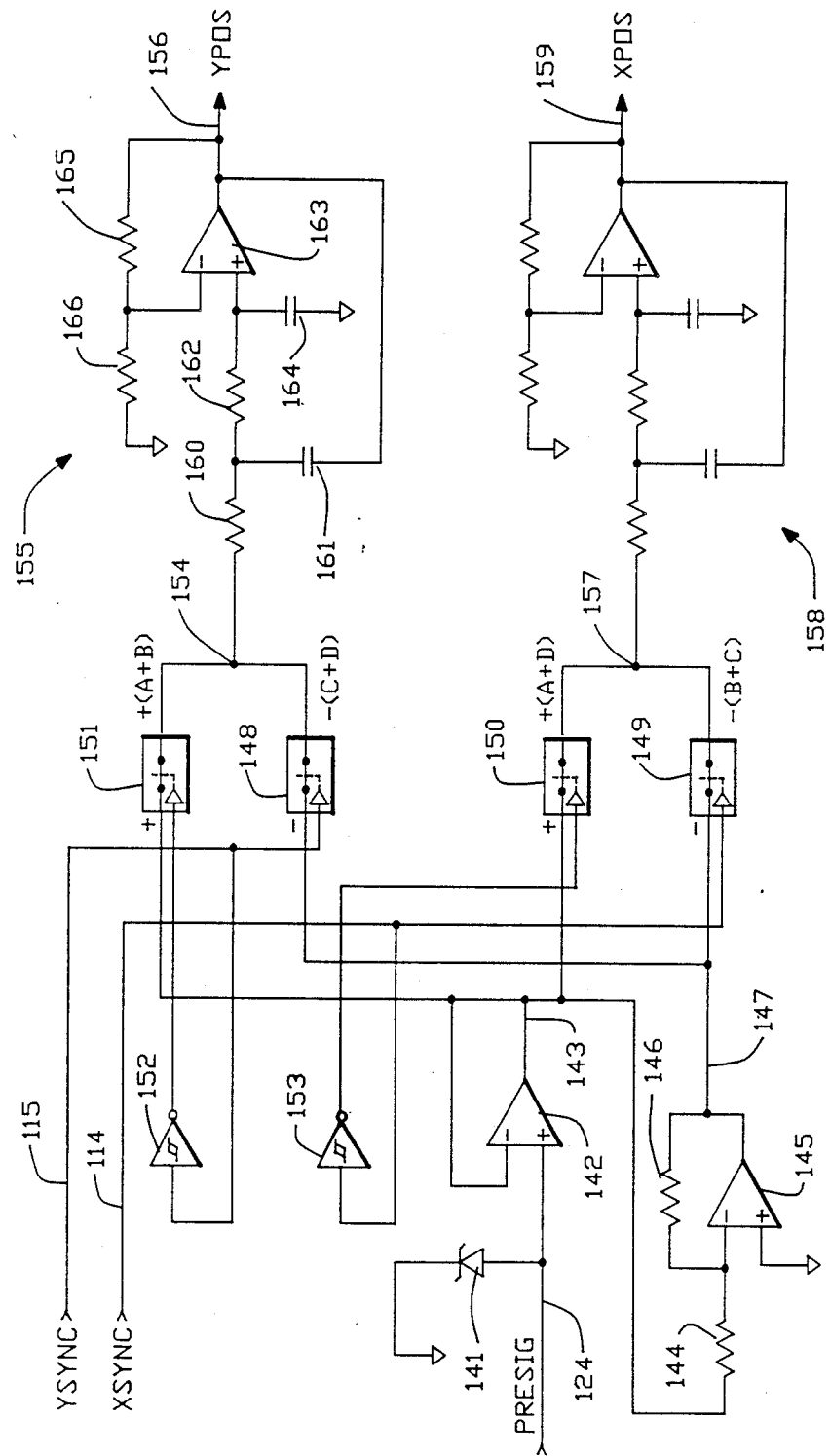
FIG. 5 is a schematic diagram of the balance of the circuit of FIG. 4, including the invertor, combinatorial logic, and output filters.

FIGS. 4 and 5 together make up a schematic diagram of a preferred embodiment of the present invention. Part numbers have been included in the figures for information concerning actual elements chosen for a particular embodiment. Of course equivalent parts could be substituted.

As shown in FIG. 4, the detector includes a 4 quadrant photodetector 100. The 4 quadrant photodetector 100 generates an output signal A on line 101 indicating intensity of the beam in a first quadrant, an output signal B on line 102 indicating the intensity of the beam in a second quadrant, an output signal C on line 103 indicating intensity of the beam in a third quadrant, and output signal D on line 104 indicating the intensity of beam in the fourth quadrant. The signals are in the form of a current which increases as the intensity of the beam in the respective quadrant increases. The detector 100 is coupled to a reverse bias voltage 105, which is bypassed by a capacitor 107 to ground, and connected to positive 12 volts supply through a current limiting resistor.

Signals A, B, C, and D are supplied on lines 101 through 104 as inputs to a switching circuit, referred to generally by reference number 109, through connector 106. Also, these signals are bypassed through protection diodes 110, 111, 112 and 113 respectively to ground.

The switching circuit 109 receives as inputs the XSYNC signal on line 114, the YSYNC signal line 115, and a control signal, ALLON on line 116. These three signals on lines 114 through 116 are supplied as inputs to a programmable array logic device 117. They are also coupled through respective pull up resistors to a positive 5 volt power supply, and through zener diodes to ground for overvoltage protection.

The programmable array logic device 117 generates switch control signals 118 - 1 through 118 - 8.

Signals A, B, C, and D are each coupled to respective switches 120 - A, 120 - B, 120 - C, and 120 - D. Likewise, they were coupled to respective switches 119 - A, 119 - B, 119 - C, 119 - D.

The switch control signals 118 - 1 through 118 - 8 cooperate to supply a time multiplexed output on line 121 which consists of samples of signals A, B, C, and D in respective timing windows as illustrated in FIG. 3. The switches 119 - A through 119 - D serve to connect the signals A, B, C and D to ground when they are not being sampled for the time multiplexed output on line 121. When the ALLON signal is asserted, all four signals are continuously supplied as output on line 121.

The time multiplexed output on line 121 is supplied as input to a variable gain preamp, shown generally by reference number 122.

The variable gain preamplifier 122 includes a operational amplifier 123 having a positive input coupled to ground and a negative input coupled to line 121. The output on line 124 of the operational amplifier 123 is coupled to a variable impedance element 125 which supplies a variable impedance feedback link across the output 124 and the input on line 121 of the operational amplifier 123.

The variable impedance element 125 includes a capacitor 126, a large resistor 127, and a variable resistance element 128 which is formed by a photoconductive isolator.

The photoconductive isolator is commercially available from Clairex. Other variable impedance elements could be utilized, such as an FET. However, the photoconductive isolator provides a large dynamic range of between about one mega-ohm to one kilo-ohm and handles large signals. Therefore it is suitable for the present application.

The variable impedance element 125 is responsive to a feedback signal for controlling the gain of the operational amplifier 123. The feedback signal is supplied by integrating amplifier 129. A negative input to the integrating amplifier 129 is connected through resistor 130 to the output on line 124 of the operational amplifier 123. A positive input to the amplifier 129 is coupled to a potentiometer 131 supplying a preset reference voltage. The amplifier 129 has a large capacitor 132 coupled in a feedback role to provide the integrating effect. The output of the amplifier is a feedback signal voltage supplied on line 133 through resistor 134 as input to opamp 135. The opamp 135 converts the voltage on line 133 to a current on line 136 suitable for the driving the photoconductive isolator. Protection diode 137 is connected across line 136 and line 138. Line 138 is connected as a feedback link to the input of opamp 135. Lines 138 and 136 are coupled across photodiode 139 in the photoconductive isolator. Photodiode 139 generates photons which control the resistance of a cadmium sulphide CdS resistor 40. As the resistance of cadmium sulphide CdS resistor 140 changes, the gain of the operational amplifier 123 is controlled. This results in normalizing the time multiplexed signal on line 121, so that the average output PRESIG on line 124 is independent of the power of the beam.

The PRESIG signal on line 124 is supplied as input to the combining logic in FIG. 5. This combining logic includes a protection diode 141, and a buffer 142. The output of the buffer on line 143 is coupled through resistor 144 as inputs to inverting amplifier 145. Resistor 146 is connected in a feedback loop across amplifier 145 to provide a unity gain inversion of the signal. The output of the invertor on line 147 is supplied as inputs to switches 148 and 149. The output of the buffer on line 143 is supplied as inputs to switches 150 and 151. The YSYNC signal is coupled to the control input to switch 148, and the through invertor 152 to the control input of switch 151. Likewise, the XSYNC signal on line 114 is coupled to the control input of switch 149 and through invertor 153 to the control input of switch 150.

Thus, the output of switch 151 supplies positive samples of signals A and B to terminal 154 during a first time window, and the output of switch 148 supplies negative samples of signals C and D to terminal 154 during a second time window. This combined signal is supplied through the averaging circuit 155 to supply the y position signal on line 156.

Likewise, the switch 150 supplies positive samples of signals A and D to terminal 157 during a first time window, while the switch 149 supplies negative samples of signals B and C to terminal 157 during a second time window. This combined signal on line 157 is supplied through the averaging circuit 158 to supply the x position output on line 159.

A digital logic circuit could be used to perform the demultiplexing and combining functions. Alternatively, digital sampling could be accomplished on the PRESIG signal on line 124, if desired.

The averaging circuits 155 and 158 are identical active filter circuits. Only averaging circuit 155 is described here. The averaging circuit 155 consists of an input resistor 160, coupled from line 154 to capacitor 161 and resistor 162. Resistor 162 is connected to the positive input of an operational amplifier 163 and to capacitor 164. The other terminal of capacitor 164 is coupled to ground. The other terminal of capacitor 161 is coupled to the output of amplifier 163. The output of amplifier 163 is coupled through feedback resistor 165 to the negative input of the amplifier 163. Likewise, the negative input of amplifier 163 is coupled through resistor 166 to ground.

This active filter circuit removes the high frequency components from and averages the combined signal on line 154 to generate a smooth analog output, which represents the average of $(A+B)-(C+D)$. This provides a y position signal.

Likewise, the signal on line 159 represents the average of $(A+D)-(B+C)$. This provides an X position signal.

The averaging circuits 155 and 158 could be implemented using the variety of techniques. For instance, digital sampling circuits could be used to convert the combined signals on lines 154 and 157 to digital values. These signals could then be arithmetically processed to generate the x and y position signals.

The variable gain preamp could be replaced by a variety of normalizing circuits. For instance, solid state multipliers and dividers could be used. A thermistor could provide normalizing effects. If the time multiplexed signal were in an AM carrier, a varicap could be used.

The generation of the XSYNC and YSYNC signals on lines 114 and 115 can be accomplished using a variety of techniques. For instance, a crystal oscillator can be supplied as input to programmable logic device, such as a PAL. The PAL can be programmed to generate the square wave outputs at the desired frequency.

It can be seen that a relatively simple circuit has been provided, which generates beam a plurality of position signals from a multiple quadrant photocell without sensitivity to the beam power, and using a single variable gain amplifier. This eliminates the need for using a plurality of matching variable gain amplifiers or other complicated circuitry for normalizing the output of the four quadrant photocell.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for detecting position of a light beam propagating along a beam path, comprising:
   detecting means, mounted in the beam path and having a reference point, for generating a plurality of position signals indicating deviation from the reference point in respective directions;
   multiplexing means, connected to the detecting means, for selecting the position signals during respective time windows as a time multiplexed output;
   normalizing means, connected to the multiplexing means, for normalizing the position signals in the time multiplexed output to generate a normalized output; and
   circuit means, connected to the normalizing means, for processing the normalized output to generate a position signal indicating position of the light beam.

2. The apparatus of claim 1, wherein the normalizing means comprises a variable gain amplifier.

3. The apparatus of claim 1, wherein the plurality of position signals includes a first signal and a second signal, and the circuit means comprises:
   means, connected to receive the normalized output, for generating an inverted normalized output;
   switching means, connected to receive the normalized output and the inverted normalized output, for generating a combined signal having the first signal in a first time window and an inverse of the second signal in a second time window; and
   means, connected to receive the combined signal, for averaging the combined signal to generate the position signal.

4. The apparatus of claim 1, wherein the detecting means includes a quad-cell photodetector.

5. An apparatus for detecting position in two dimensions of a light beam propagating along a beam path, comprising:
   detecting means, mounted in the beam path and having detector face with first, second, third and fourth quadrants, for generating a first signal indicating intensity of the beam in the first quadrant, a second signal indicating intensity of the beam in the second quadrant, a third signal indicating intensity of the beam in the third quadrant, and a fourth signal indicating intensity of the beam in the fourth quadrant;
   multiplexing means, connected to the detecting means, for generating a time multiplexed output including samples of the first, second, third and fourth signals in respective time windows;
   normalizing means, connected to the multiplexing means, for normalizing the samples of the first, second, third and fourth signals in the time multiplexed output to generate a normalized output; and
   circuit means, connected to the normalizing means, for processing the normalized output to generate a first position signal indicating position of the light beam in a first dimension and a second position signal indicating position of the light beam in a second dimension.

6. The apparatus of claim 5, wherein the normalizing means comprises a variable gain preamplifier.

7. The apparatus of claim 5, wherein the circuit means comprises:
   means, connected to receive the normalized output, for generating an inverted normalized output;
   first switching means, connected to receive the normalized output and the inverted normalized output, for generating a first combined signal having the first signal in a first time window, the second signal in a second time window, an inverse of the third signal in a third time window, and an inverse of the fourth signal in a fourth time window;
   second switching means, connected to receive the normalized output and the inverted normalized output, for generating a second combined signal having the first signal in a first time window, an inverse of the second signal in a second time window, an inverse of the third signal in a third time window, and the fourth signal in a fourth time window;
   first averaging means, connected to receive the first combined signal, for averaging the first combined signal to generate the first position signal; and
   second averaging means, connected to receive the second combined signal, for averaging the second combined signal to generate the second position signal.

8. The apparatus of claim 5, wherein the detecting means includes a quad cell photodetector.

9. The apparatus of claim 5, wherein the normalizing means comprises:
   an operational amplifier having a positive input coupled to ground, a negative input coupled to receive the time multiplexed output, and an amplifier output, and supplying the normalized output to the amplifier output; and
   a feedback loop, connected between the amplifier output and the negative input, for controlling gain of the operational amplifier, the feedback loop including:
   an integrating amplifier, having a negative input coupled to the amplifier output, a positive input coupled to a set point reference voltage, and integrated output supplying a feedback signal, and
   a variable impedance means, connected between the amplifier output and the negative input of the operational amplifier and receiving the feedback signal, for supplying a variable impedance link between the amplifier output and the negative input in response to the feedback signal.

10. The apparatus of claim 9, wherein the variable impedance means comprises a photoconductive isolator.

11. An apparatus for detecting position in two dimensions of a light beam propagating along a beam path, comprising:
    detecting means, mounted in the beam path and having detector face with first, second, third and fourth quadrants, for generating a first signal indicating intensity of the beam in the first quadrant, a second signal indicating intensity of the beam in the second quadrant, a third signal indicating intensity of the beam in the third quadrant, and a fourth signal indicating intensity of the beam in the fourth quadrant;
    multiplexing means, connected to the detecting means, for generating a time multiplexed output including samples of the first, second, third and fourth signals in respective time windows;

normalizing means, connected to the multiplexing means, for normalizing the samples of the first, second, third and fourth signals in the time multiplexed output to generate a normalized output; and means, connected to receive the normalized output, for generating an inverted normalized output;

first switching means, connected to receive the normalized output and the inverted normalized output, for generating a first combined signal having the first signal in a first time window, the second signal in a second time window, an inverse of the third signal in a third time window, and an inverse of the fourth signal in a fourth time window;

second switching means, connected to receive the normalized output and the inverted normalized output, for generating a second combined signal having the first signal in a first time window, an inverse of the second signal in a second time window, an inverse of the third signal in a third time window, and the fourth signal in a fourth time window;

first averaging means, connected to receive the first combined signal, for averaging the first combined signal to generate a first position signal indicating position of the beam in a first dimension; and second averaging means, connected to receive the second combined signal, for averaging the second combined signal to generate the second position signal indicating position of the beam in a second dimension.

12. The apparatus of claim 11, wherein the normalizing means comprises a variable gain preamplifier.

13. The apparatus of claim 11, wherein the detecting means includes a quad-cell photodetector.

14. The apparatus of claim 11, wherein the normalizing means comprises:

an operational amplifier having a positive input coupled to ground, a negative input coupled to receive the time multiplexed output, and an amplifier output, and supplying the normalized output to the amplifier output; and a feedback loop, connected between the amplifier output and the negative input, for controlling gain of the operational amplifier, the feedback loop including:

an integrating amplifier, having a negative input coupled to the amplifier output, a positive input coupled to a set point reference voltage, and integrated output supplying a feedback signal, and a variable impedance means, connected between the amplifier output and the negative input of the operational amplifier and receiving the feedback signal, for supplying a variable impedance link between the amplifier output and the negative input in response to the feedback signal.

15. The apparatus of claim 14, wherein the variable impedance means comprises a photoconductive isolator.

* * * * *